(12) United States Patent
Comte et al.

(10) Patent No.: US 10,925,252 B2
(45) Date of Patent: Feb. 23, 2021

(54) CHEESE MOULDING DEVICE WITH AN ENHANCED LEVEL OF HYGIENE

(71) Applicant: ETABLISSEMENTS CHALON MEGARD, Montreal la Cluse (FR)

(72) Inventors: Bruno Comte, Montreal la Cluse (FR); Michel Caldoguetto, Montreal la Cluse (FR); Christophe Charbon, Montreal la Cluse (FR); Albert Berthier, Montreal la Cluse (FR)

(73) Assignee: ETABLISSEMENTS CHALON MEGARD, Montreal la Cluse (FR)

( * ) Notice: Subject to any disclaimer, the term of this patent is extended or adjusted under 35 U.S.C. 154(b) by 0 days.

(21) Appl. No.: 15/512,104

(22) PCT Filed: Sep. 17, 2015

(86) PCT No.: PCT/FR2015/052497
§ 371 (c)(1),
(2) Date: Mar. 17, 2017

(87) PCT Pub. No.: WO2016/042272
PCT Pub. Date: Mar. 24, 2016

(65) Prior Publication Data
US 2017/0273272 A1 Sep. 28, 2017

(30) Foreign Application Priority Data
Sep. 18, 2014 (FR) ...................................... 14/58815

(51) Int. Cl.
*A01J 25/13* (2006.01)
*A01J 25/12* (2006.01)
*A01J 25/15* (2006.01)

(52) U.S. Cl.
CPC ............... *A01J 25/13* (2013.01); *A01J 25/12* (2013.01); *A01J 25/126* (2013.01); *A01J 25/15* (2013.01)

(58) Field of Classification Search
CPC .. A01J 25/13; A01J 25/15; A01J 25/12; A01J 25/126; A01J 25/123
See application file for complete search history.

(56) References Cited

U.S. PATENT DOCUMENTS

| 4,137,836 A | * | 2/1979 | Megard | .................. A01J 25/112 99/454 |
| 2012/0125209 A1 | * | 5/2012 | Lockyer | ................. A01J 25/112 99/452 |

FOREIGN PATENT DOCUMENTS

| EP | 0923856 A1 | 6/1999 |
| FR | 2679736 A1 | 2/1993 |

(Continued)

OTHER PUBLICATIONS

International Search Report dated Jan. 12, 2016 re: Application No. PCT/FR2015/052497; pp. 1-2; citing: FR 2 679 736 A1, WO 2010/136994 A1, EP 0 923 856 A1 and NZ 248 758 A.

*Primary Examiner* — Seyed Masoud Malekzadeh
(74) *Attorney, Agent, or Firm* — Cantor Colburn LLP

(57) ABSTRACT

A cheese moulding device with an enhanced level of hygiene. The invention relates to a cheese moulding device (100) comprising: —at least one moulding drum (1) comprising a lower portion comprising a base (3) delimiting an open enclosure shaped to receive at least one cheese mould (13), —at least one mobile plate (12) configured to support the at least one cheese mould (13), the mobile plate (12) being shaped to seal the lower portion of the moulding drum (1) in a first so-called sealing position and to allow access to said cheese mould (13) in a second so-called retracted position, —at least one washing circuit configured to clean (Continued)

said moulding device (100), said washing circuit comprising at least one section of circuit (15) opening into the lower portion of the moulding drum (1), characterised in that the moulding device (100) further comprises at least one protective casing (4) positioned between the base (3) of the moulding cylinder (1) and the mobile plate (12), said protective casing (4) delimiting an enclosure that is sealed relative to the outside of the moulding device (100).

6 Claims, 3 Drawing Sheets

(56) References Cited

FOREIGN PATENT DOCUMENTS

| | | |
|---|---|---|
| NZ | 248758 A | 6/1996 |
| WO | 2010136994 A1 | 12/2010 |

* cited by examiner

CHEESE MOULDING DEVICE WITH AN ENHANCED LEVEL OF HYGIENE

TECHNICAL FIELD

The invention concerns the field of the molding of cheeses, preferably the pressed paste cheeses, and more particularly the devices for molding cheeses and their cleaning system.

BACKGROUND

The invention concerns the devices for molding cheese specialties or cooked pressed paste cheeses known under the names of «Comté», «Emmental», «Beaufort», and half-cooked or uncooked pressed paste cheeses known under the name of «Raclette», «Morbier», «Tomme», «Cantal» or the like in their technological cheese classification but commercialized under other names.

Conventionally, the devices for molding cheeses comprise a molding cylinder including a lower portion defining an enclosure shaped to receive at least one cheese mold, a movable plate configured to support the at least one cheese mold, a washing piping opening into the molding cylinder and configured to feed a washing liquid into said molding cylinder.

It is known from the document FR2679736 B1, that the molding device is equipped with a high piping allowing the creation of a depression in the molding cylinder in order to allow the filling of the said molding cylinder by another piping of a curd/whey mixture in the bottom portion of the molding cylinder. After this phase called filling phase, the surplus of whey is evacuated by one or more whey extraction valve(s) and then the lowered mold is removed and the washing piping injects a washing liquid into the molding cylinder to clean it.

The current molding devices have molding cylinders whose lower portion is sometimes difficult to access during cleaning operations.

Further, the used cleaning system is a high pressure water jet cleaning which causes risks of dispersion of the microorganisms and potential sowing of the production environment at the lower portion of the molding cylinder.

Moreover, with this type of known molding devices, during projections on the top portion of the molding cylinder resulting from the molding of the cheeses or from operations on the periphery of this equipment, a transfer by runoff can take place, reaching then the lower portion of the molding cylinder and transforming into a source of contamination by falling into the extracted whey.

BRIEF SUMMARY

The invention aims to overcome all or part of the aforementioned disadvantages.

A molding device for cheeses is provided comprising:
- at least one molding cylinder including a lower portion including a base delimiting an open enclosure shaped to receive at least one cheese mold,
- at least one movable plate configured to support the at least one cheese mold, the movable plate being shaped to close the lower portion of the molding cylinder in a first position called closing position and to allow access to said cheese mold in a second position called retracted position,
- at least one washing circuit configured to clean said molding device, said washing circuit including at least one circuit section opening into the lower portion of the molding cylinder, characterized in that the molding device further comprises at least one protective casing positioned between the base of the molding cylinder and the movable plate, said protective casing delimiting a closed enclosure relative to the outside of the molding device.

Thanks to this new molding device configuration, a high level of health is obtained. Thus, the recommendations aiming forbidding the high pressure water jet cleaning are respected. Indeed, the establishment of a sealed protective casing between the lower portion of the cylinder and the movable plate allows avoiding any contamination by the upper portion of the molding device or other apparatuses located in this area and it allows also the implementation of an automatic washing.

According to a characteristic of the invention, the protective casing comprises an upper wall sealingly connected to the base of the molding cylinder.

According to a characteristic of the invention, an opening is formed on the upper wall of the protective casing, said opening being shaped to at least partially receive the movable plate in the closing position. Advantageously, in the closing position, the movable plate sealingly separates the base of the molding cylinder from the protective casing.

According to a characteristic of the invention, the protective casing comprises a lower wall positioned opposite to the upper wall and at least one side wall joining the upper wall to the lower wall, the at least one upper wall of said protective casing having at least one slope oriented to the outside of said molding device. The slope of the upper wall allows avoiding any retention in the upper portion which can be transformed into a source of contamination by stagnation.

According to a characteristic of the invention, the upper wall is sealingly fastened on the outer periphery of the base of the molding cylinder.

Preferably, the upper wall is continuously welded in a sealed manner on the outer periphery of the base of the molding cylinder.

Preferably, the outer periphery of the base has an edge with an oversize shape to limit any possible retention.

According to a characteristic of the invention, the movable plate comprises a peripheral groove formed on at least one portion of the periphery of said movable plate, the peripheral groove being shaped to receive a sealing gasket intended to allow the sealed closing of the base of the molding cylinder when said movable plate is in the closing position.

Advantageously, the sealing gasket of the movable plate is positioned in support in the groove in order to ensure its holding in position. Thus, thanks to the gasket holding, the disassembly operations with a view to an inspection or to a cleaning are facilitated. The sealing gasket allows a hermetic insulation of the cheese mold in the base by obtaining a contact under pressure with the peripheral edge of the base.

According to a characteristic of the invention, the molding device comprises a lifting member of the movable plate positioned in the protective casing, said lifting member being configured to allow the displacement of the movable plate at least between the closing position and the retracted position of said movable plate.

According to a characteristic of the invention, the lifting member comprises an integrated wiper seal configured to avoid the penetration of dust or liquid into the lifting member.

Advantageously, the wiper seal is positioned at an upper end of the member, the upper end of the member being the end positioned proximally relative to the movable plate.

According to a characteristic of the invention, the lifting member comprises an additional gasket reinforcing the sealing and a valve configured to control the sealing of said gasket.

According to a characteristic of the invention, the valve is a valve with quick disassembly.

According to a characteristic of the invention, the valve is positioned between the upper gasket and the wiper seal.

According to a characteristic of the invention, the protective casing comprises an access hatch formed on a side wall of said protective casing.

Thus, the penetration inside the molding device of a fluid flowing on the outer face of the side wall is avoided.

Further, the projection outside the molding device, of a fluid sprayed inside, more particularly in the washing phase, is also avoided, which is very significant since the fluid may contain soda/lye or acid at high temperature.

Advantageously, the access hatch allows the access to the inside of the casing in the proximity of each molding cylinder. Thus, the review or the disassembly of a peripheral sealing gasket integrated into the movable plate and the review of the upper gasket of lifting actuator of the movable plate, are possible. Further, the access hatch also allows to quickly remove a mold in case of problem and/or to remove the movable plate in case of maintenance operation at the lifting actuator of the movable plate.

According to a characteristic of the invention, the washing circuit comprises a plurality of circuit sections serving the molding cylinder, a first circuit section opening into the top portion, a second circuit section opening into the base.

According to a characteristic of the invention, the washing circuit comprises at least one dispensing and washing member positioned in the protective casing which allows a projection of the washing liquid on all the inner surfaces of the protective casing as well as on the upper surface of the movable plate.

According to a characteristic of the invention, the washing circuit comprises at least one other dispensing and washing member arranged to project washing liquid under the movable plate and at the lifting member.

According to a characteristic of the invention, the dispensing and washing member(s) comprise(s) the at least one fixed or rotary washing head.

According to a characteristic of the invention, the washing circuit is of the type CIP « Clean-in-place ». The washing circuit is automatic. The washing circuit is integrated to the molding device which allows a cleaning of said molding device without disassembly.

According to a characteristic of the invention, the molding cylinder comprises an inner cavity configured to contain a curd/whey mixture, at least one vacuuming member of the molding cylinder, at least a first feed piping of the curd/whey mixture for a vacuum molding opening into the inner cavity.

According to a characteristic of the invention, the molding cylinder comprises at least a second feed piping of the curd/whey mixture for a molding under pressure opening into the inner cavity and including a transfer member configured to ensure the feed under pressure of the curd/whey mixture into the molding cylinder, the vacuuming member and the transfer member being selectively operated following the chosen molding.

According to a characteristic of the invention, said molding device comprises at least two molding cylinders and a protective casing sealingly linked to said at least two molding cylinders.

BRIEF DESCRIPTION OF THE DRAWINGS

The invention will be better understood, thanks to the description below, which relates to an embodiment according to the present invention, given by way of non-restrictive example and explained with reference to the appended schematic drawings, wherein.

DETAILED DESCRIPTION

Figure 1:
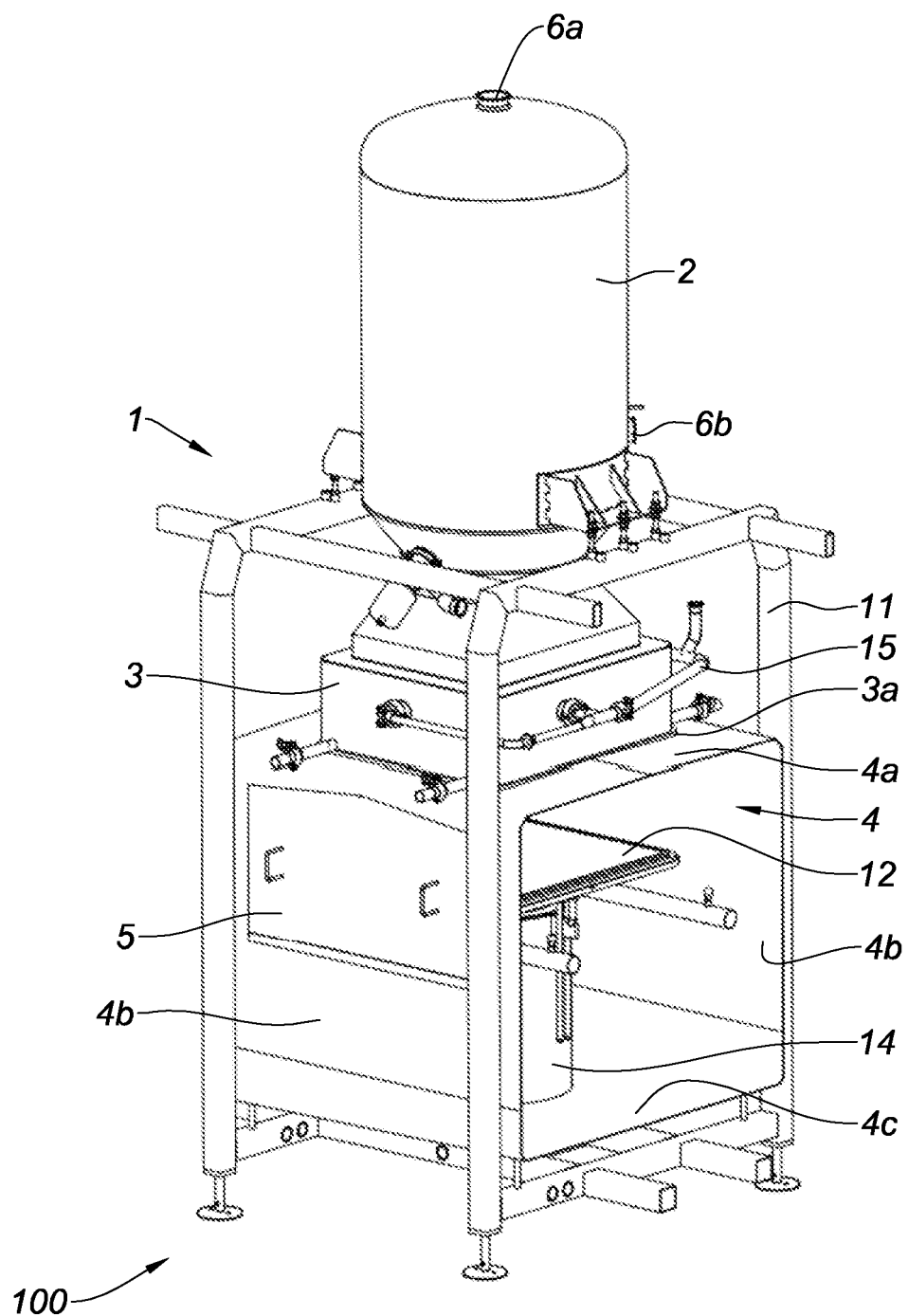
FIG. 1 is a perspective view of a molding device according to the invention.
Figure 2:
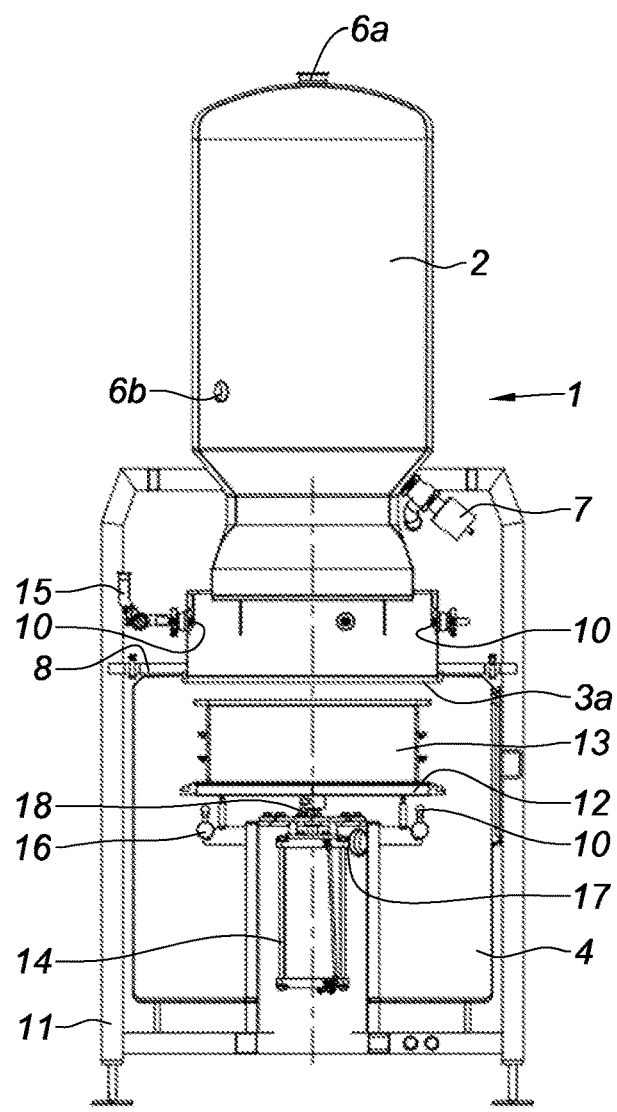
FIG. 2 is a sectional view of the molding device shown in FIG. 1.

As illustrated in FIGS. 1 and 2, the molding device 100 according to the invention, comprises a molding cylinder 1 comprising an upper portion delimiting an inner cavity 2, and a lower portion including a base 3 delimiting an open enclosure extending the inner cavity 2 of the upper portion of the molding cylinder 1.

The molding cylinder 1 further comprises a first whey extraction valve 7 at the base of the inner cavity 2, the first whey extraction valve 7 being arranged to evacuate the excess of whey in the inner cavity 2.

Further, the molding cylinder 1 is mounted on a structure 11. The structure 11 is the frame itself of the molding device 100 and is designed and dimensioned in order to obtain a maximum rigidity of said molding device 100. Further, the structure 11 opposes the deformation stresses caused by the lifting action of the movable plate 12 in order to obtain the sealing which is necessary for the creation and vacuum holding for the vacuum molding.

Figure 4:
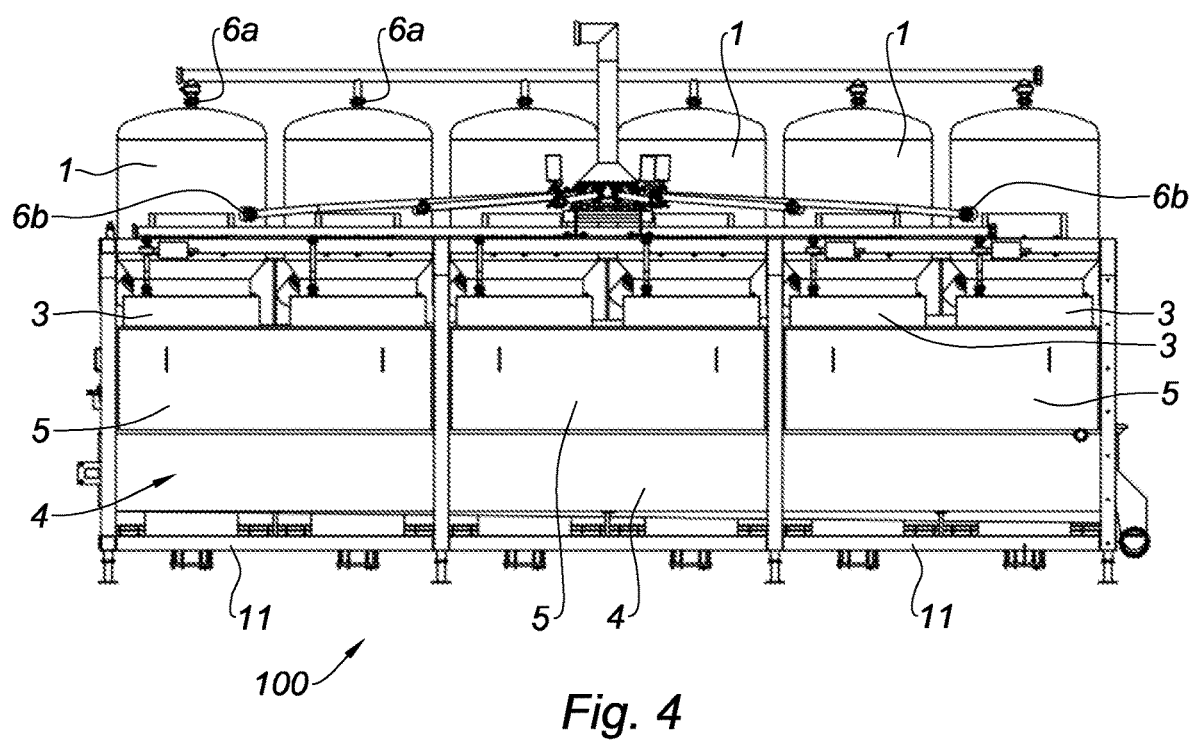
FIG. 4 is a side view of a molding device according to the invention comprising a plurality of molding cylinders.

As seen in FIGS. 1, 2 and 4, the molding cylinder 1 can comprise two supply orifices 6a, 6b in curd/whey mixture shaped to allow the introduction of said mixture into the molding cylinder 1 following the method of retained vacuum molding or retained molding under pressure. The first supply orifice 6a opens with the top of the molding cylinder 1 and the second supply orifice 6b opens laterally into the molding cylinder 1. The two supply orifices 6a, 6b are connected to a general supply circuit (not shown).

According to the invention, the open enclosure of the base 3 is shaped to receive a cheese mold 13 as illustrated in FIG. 2. The open enclosure of the base 3 is intended to be closed by a movable plate 12 described hereinafter.

Advantageously, and as shown in FIG. 2, the base 3 has a peripheral edge 3a with an oversize. In addition, the base 3 is continuously welded on an upper wall of a protective casing 4 which will be detailed hereinafter.

The base 3 comprises at least one whey extraction valve 8 arranged to evacuate the excess of whey present in the mold 13 during the molding of the cheese.

The molding device 100 comprises a movable plate 12 configured to support the at least one cheese mold 13. The movable plate 12 is shaped to close the base 3 of the molding cylinder 1 in a first closing position and to allow access to the cheese mold 13 in a second retracted position. The movable plate 12 is moved by a lifting member 14 illustrated in FIGS. 1 and 2.

The lifting member 14 comprises an actuator allowing the crushing of the peripheral gasket of the movable plate 12.

The lifting member 14 is vertically offset by a sufficient distance to allow the installation of a sealing gasket 18 which allows a hermetic insulation of the lifting member 14 from the inside of the protective casing 4 and of an valve 17 with quick disassembly for controlling the reinforced sealing of said lifting member 14.

The valve 17 is accessible after opening the access hatch 5 which will be described hereinafter.

Figure 3:
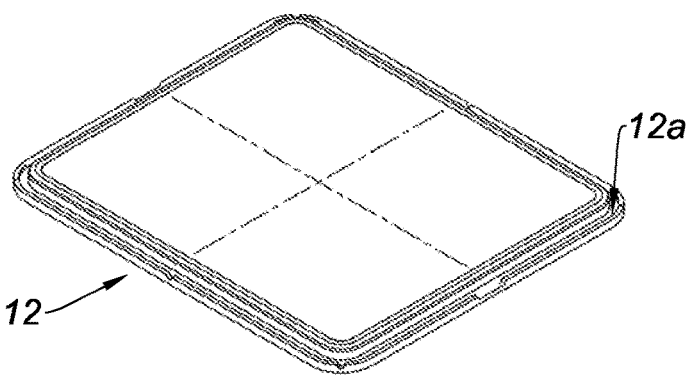
FIG. 3 is a perspective view of a movable plate according to the invention and equipping the molding device shown in FIG. 1.

As illustrated in FIG. 3, the movable plate 12 comprises a peripheral groove 12a which is intended to receive a sealing gasket (not shown). The sealing gasket allows a hermetic insulation of the cheese mold 13 in the base 3 by obtaining a contact under pressure with the peripheral edge 3a.

The movable plate 12, whose representation here is of globally rectangular shape has generally the same shape as the transverse section of the base 3 of the molding cylinder 1 and which can as well be circular or polygonal.

The molding device 100 comprises a washing circuit configured to clean said molding device 100. The washing circuit comprises a plurality of circuit sections, a first circuit section 15 opening into the base 3, a second circuit section 16 opening into a protective casing 4 described later in the description.

The first circuit section 15 comprises a plurality of dispensing and washing members such as fixed or rotary washing heads 10 dedicated to the cleaning of the base 3 and above the movable plate 12, as shown in FIG. 2.

The second circuit section 16 is dedicated to the cleaning of the underside of the movable plate 12 and the protective casing 4. The second circuit section 16 comprises a plurality of dispensing and washing members such as fixed or rotary washing heads shown in FIG. 2.

The molding device 100 further comprises a protective casing 4 positioned between the base 3 of the molding cylinder 1 and the movable plate 12. The protective casing 4 delimits a sealed enclosure relative to the outside of the molding device 100.

In the example illustrated in FIG. 1, the protective casing 4 comprises an upper wall 4a having an opening sealingly linked to the open enclosure of the base 3 of the molding cylinder 1.

The movable plate 12 sealingly separates the base 3 of the molding cylinder 1 from the protective casing 4 when it is in the closing position.

The protective casing 4 comprises a lower wall 4c positioned opposite to the upper wall 4a and two side walls 4b linking the upper wall 4a to the lower wall 4c.

The upper wall 4a of the protective casing 4 has a slope oriented to the outside of said molding device 100. The slope of the upper wall 4a, at least equal to 1%, thus avoiding retentions of fluids on the outer face.

In the example illustrated in FIG. 1, the protective casing 4 comprises an access hatch 5 formed on a side wall 4b of said protective casing 4.

Each sealing gasket present in the peripheral groove 12a of the movable plate 12 is accessible after opening the access hatch 5 of the protective casing 4.

Preferably, an access hatch 5 is formed for each molding cylinder 1.

FIG. 4 shows a particular molding device 100 configuration according to which the molding device 100 comprises a plurality of molding cylinders 1.

The molding cylinders 1 are paired and linked sealingly to a protective casing 4 with a common access hatch 5 for each pair of molding cylinder 1. Of course, the configuration illustrated in FIG. 4 is only a non-restrictive example, the molding cylinders 1 which can be disposed differently and/or grouped otherwise, always within the scope of the invention.

In a non-shown variant, the molding cylinders are sealingly linked to a protective casing comprising an access hatch per molding cylinder.

The invention is not limited to the embodiment described and shown in the appended figures. Modifications remain possible, in particular from the point of view of the constitution of the various elements or by substitution of technical equivalents, without departing from the protection field of the invention.

The invention claimed is:

1. A molding device for cheeses comprising:
   at least one molding cylinder including a lower portion including a base delimiting an open enclosure shaped to receive at least one cheese mold,
   at least one movable plate configured to support the at least one cheese mold, the at least one movable plate being shaped to close the lower portion of the at least one molding cylinder in a first position called closing position and to allow access to said cheese mold in a second position called retracted position,
   at least one washing circuit configured to clean said molding device, said at least one washing circuit including at least one circuit section opening into the lower portion of the at least one molding cylinder, and
   at least one protective casing positioned between the base of the at least one molding cylinder and the at least one movable plate, said at least one protective casing delimiting a sealed enclosure relative to an outside of the molding device,
   wherein the at least one protective casing comprises an upper wall sealingly linked to the base of the at least one molding cylinder in such a way that said at least one movable plate sealingly separates the base of the at least one molding cylinder from the at least one protective casing when the at least one movable plate is in the closing position, wherein an opening is formed on the upper wall of the at least one protective casing, the opening is configured to at least partially receive the at least one movable plate in the closing position, and wherein the at least one washing circuit comprises at least one dispensing and washing member positioned in the at least one protective casing.

2. The molding device according to claim 1, wherein the at least one protective casing comprises a lower wall positioned opposite to the upper wall and at least one side wall linking the upper wall to the lower wall, the upper wall of said at least one protective casing having at least one slope oriented to an outside of the at least one molding device.

3. The molding device according to claim 1, wherein the at least one movable plate comprises a peripheral groove formed on at least one portion of a periphery of said at least one movable plate, the peripheral groove being shaped to receive a sealing gasket intended to allow a sealed closing of the base of the molding cylinder when said movable plate is in the closing position.

4. The molding device according to claim 1, wherein the molding device further comprises a lifting member of the said at least one movable plate positioned in the said at least one protective casing, said lifting member being configured to allow the displacement of the at least one movable plate at least between the closing position and the retracted position of said at least one movable plate.

5. The molding device according to claim 4, wherein the lifting member comprises an additional gasket reinforcing the sealing and a valve configured to control the sealing of said gasket.

6. The molding device according to claim 2, wherein the at least one protective casing comprises an access hatch formed on a side wall of said at least one protective casing.

* * * * *